US011769019B1

(12) United States Patent
Mathur et al.

(10) Patent No.: US 11,769,019 B1
(45) Date of Patent: Sep. 26, 2023

(54) MACHINE TRANSLATION WITH ADAPTED NEURAL NETWORKS

(71) Applicant: Amazon Technologies, Inc., Seattle, WA (US)

(72) Inventors: Prashant Mathur, New York, NY (US); Georgiana Dinu, New York, NY (US); Anna Currey, New York, NY (US); Eric J. Nowell, Kirkland, WA (US); Aakash Upadhyay, Seattle, WA (US); Haiyu Yao, Seattle, WA (US); Marcello Federico, Trento (IT); Yaser Al-Onaizan, Cortlandt Manor, NY (US); Rama Krishna Sandeep Pokkunuri, Redmond, WA (US); Jian Wang, Bellevue, WA (US); Xianglong Huang, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 147 days.

(21) Appl. No.: 16/953,205

(22) Filed: Nov. 19, 2020

(51) Int. Cl.
  *G06F 40/58* (2020.01)
  *G06N 3/08* (2023.01)
(52) U.S. Cl.
  CPC .............. *G06F 40/58* (2020.01); *G06N 3/08* (2013.01)

(58) Field of Classification Search
  None
  See application file for complete search history.

(56) References Cited

U.S. PATENT DOCUMENTS

| 9,519,643 | B1* | 12/2016 | Nakagiri | G06F 40/289 |
| 10,747,962 | B1* | 8/2020 | Fuerstenau | G06N 3/0454 |
| 2018/0046618 | A1* | 2/2018 | Lee | G06N 3/08 |
| 2018/0060727 | A1* | 3/2018 | Rainwater | G06N 3/044 |
| 2019/0243902 | A1* | 8/2019 | Saeki | G06F 40/30 |
| 2020/0272899 | A1* | 8/2020 | Dunne | G06N 3/0454 |

* cited by examiner

*Primary Examiner* — Quynh H Nguyen
(74) *Attorney, Agent, or Firm* — Davis Wright Tremaine LLP

(57) ABSTRACT

A translation system receives examples of translations between a first language and a second language. In response to receiving request to translate a source text from the first language to the second language, the system ranks the examples based on the example's applicability to one or more portions of the source text. The system performs additional training of a neural network that was pre-trained to translate from the first language to the second language, where the additional training is based on one or more top-ranking examples. The system translates the source text to the second language using the additionally trained neural network.

20 Claims, 9 Drawing Sheets

MACHINE TRANSLATION WITH ADAPTED NEURAL NETWORKS

BACKGROUND

Machine-based text translation involves the automatic translation of documents from the document's original language to another language. One approach to performing machine-based text translation is to use neural networks or other comparable machine-learning techniques. However, the use of such techniques may not be well suited to all purposes, including when machine-based text translation is provided as a hosted computing service.

BRIEF DESCRIPTION OF THE DRAWINGS

Various techniques will be described with reference to the drawings, in which.

DETAILED DESCRIPTION

Figure 1:
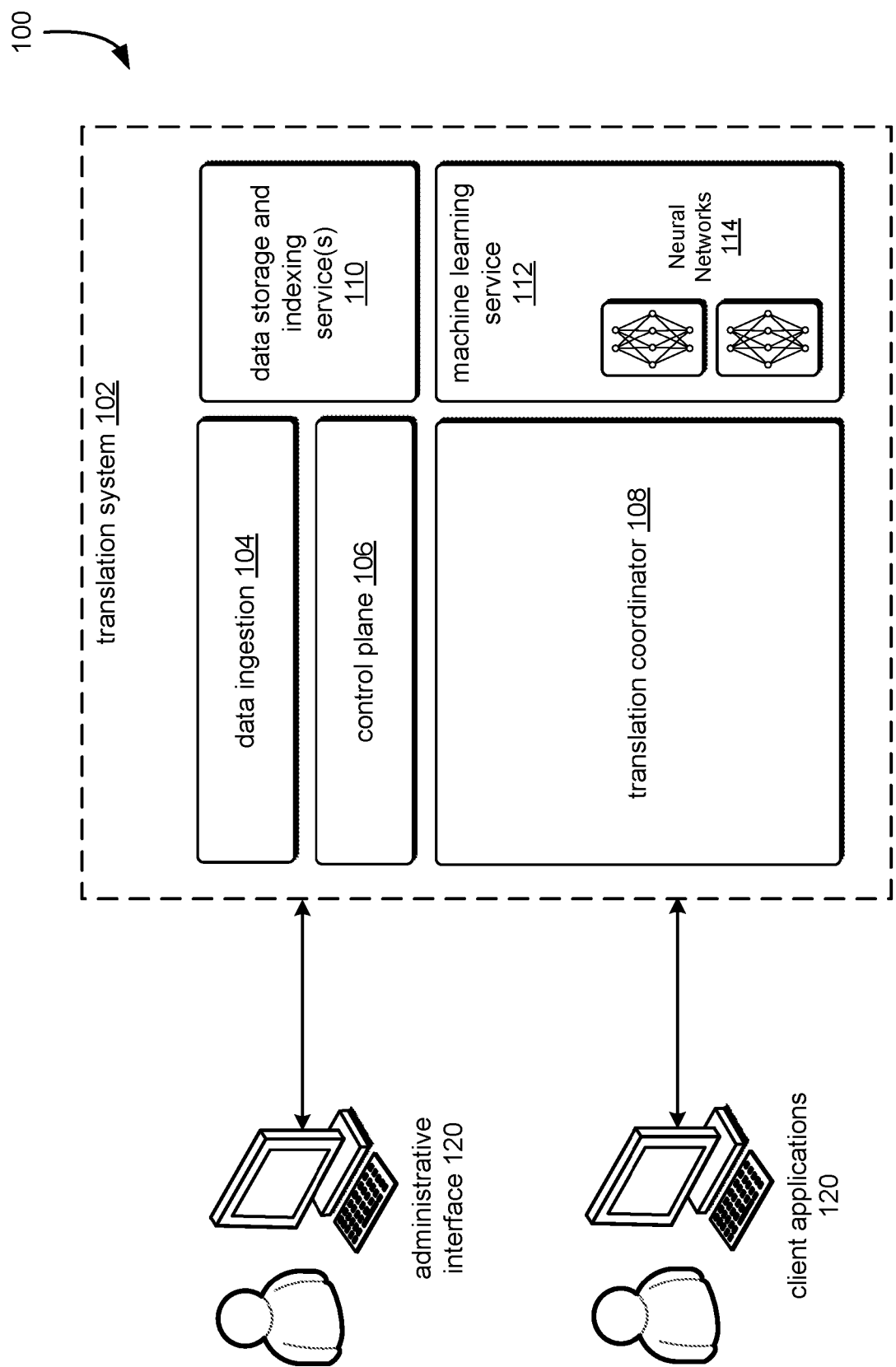
FIG. 1 illustrates an example of a translation system, in accordance with an embodiment.

In an example, a translation system provides machine-based text translation services. The system uses a neural network trained using a wide variety of commonplace examples of translation between a source language and a destination language, but further allows dynamic customization of the translation process by performing additional training on the neural network. In some cases, the customization may be applied to individual phrases, sentences, or paragraphs of text.

In this example, the translation system is provided with a set of translation examples that may be relevant to particular translation tasks. For example, a client might provide the service with a set of translation examples related to a particular field of endeavor, including examples such as words or phrases whose meaning is specialized for the particular field, idioms particular to the field, and so forth. These examples may be stored by the service until needed for use in relation to a relevant translation task.

Upon receiving a request to translate a document, the example translation system loads the translation examples and analyzes the relevance of the examples to the document. In this example, relevance is determined by calculating, for each example, a score that indicates how applicable the respective example is to the document. Applicability of an example may refer to its similarity, or relevance. The examples are then ranked in order of applicability. The top N examples are then selected, and used to perform additional training on the neural network, which as noted above was pre-trained for performing translation tasks using a dataset of commonplace examples. The additional training of this neural network, using the top N examples, can be performed rapidly. The additionally trained neural network is then used to translate the document.

In some cases, the document is subdivided into portions and the top-ranked translation examples for each portion are used to additionally train a neural network that is then used to translate that portion. If none of the examples are sufficiently relevant to some or all of a portion of the document, the default neural network, trained with the dataset of commonplace examples, is used to translate that portion. The separately translated portions are then reassembled into a complete translated document.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of improved translation accuracy, improved translation efficiency, and improved training of neural networks for machine translation.

FIG. 1 illustrates an example of a translation system, in accordance with an embodiment. In the depicted example 100, a translation system 102 is configured based on input from an administrative interface 120 and used by one or more client applications 122. The translation system 102 provides language translation services that are customizable to specific domains, according to configuration input provided via the administrative interface 120.

In at least one embodiment, an administrative interface 120 comprises a web-based user interface through which domain-specific translation examples are provided. Examples of domain-specific translation examples include pairs of phrases, where one member of each pair is in a source language and the other is in a destination language. Note that although generally described herein as pairs or translation pairs, embodiments may support translation tuples, in which one member is in a source language and the other members provide corresponding phrases in N destination languages. A phrase may refer to a word, sequence of words, clause, sentence, or other part of speech, or collection of such parts. In at least one embodiment, a phrase comprises a plurality of sentences. A pair of phrases, when provided in a translation example, provides an example of how a phrase in a source language may be translated to a target language.

A collection of translation examples may sometimes be referred to as parallel data, or as a parallel dataset. Collections of translation examples may also sometimes be referred to as customization data, specialization data, domain-specific data, and so forth. In at least one embodiment, one or more neural networks 114 may be trained with general-purpose, or primary data, that is intended to have general applicability rather than to be specialized for any specific domain. As such, the one or more neural networks 114 may work reasonably well for a wide variety of translation tasks, but less well when required to translate documents that include domain-specific words, phrases, idioms, and so forth. Domain specificity refers to words, phrases, idioms, and so forth which may tend to be used within specialized fields, within certain organizations, and so forth.

The administrative interface 120, in at least one embodiment, receives parallel data and transmits it to the translation system 102. The control plane 106 interfaces with the data ingestion service 104 to cause a data storage and indexing service(s) 110 to store the parallel data.

The data storage and indexing service(s) 110 stores the parallel data. In at least one embodiment, the data storage and indexing service(s) 110 comprises a block storage service and an index/search service. The parallel data is stored, and is then inert, until a related request to translate a document is received. The index/search service then loads the parallel data and indexes it for use in embodiments of the translation process described herein.

The control plane 106, in at least one embodiment, comprises one or more computing devices and software components to facilitate interaction between components of the translation system 102. The control plane 106 may also implement various configuration actions on the translation system 102, such as allocating storage and compute resources.

A translation coordinator 108, in at least one embodiment, controls and facilitates performance of translation tasks. For example, in at least one embodiment, one of the client applications 120 submits a request to translate a source text, such as a document. The request may sometimes be referred to as a translation query, translation job, or translation workflow. The translation coordinator 108 may receive the translation request and, in some embodiments working in conjunction with the control plane 106, utilize the data storage and indexing service(s) 110 and machine learning service 112 to translate the source text.

The source text may include textual data in a source language that is to be translated, by the system 102, to a destination language. In some cases, the textual data corresponds to any of a document, form, or record. The textual data may also be derived, in some embodiments, from voice input.

In at least one embodiment, the one or more client applications include computer programs that transmits a request to translate a source text in a source language to the translation system 102 and receives, from the translation system 102, textual data in the destination language. The computer programs may execute on any one or more of a variety of computing devices, include smartphones, tables, personal computers, servers, and so forth. In at least one embodiment, the client applications 120 execute using compute capacity provided by a hosted computing resource provider.

A translation request issued by one of the client applications 120 may be associated with parallel data previously loaded via the administrative interface. The request may itself indicate which set of parallel data should be used, or embodiments may rely on data which links the request to the session or account that loaded the parallel data. This parallel data may then be used, as described herein, to complete the translation request in view of the translation examples provided by the parallel data.

In at least one embodiment, the machine learning service 112 provides various machine learning capabilities via computing resources managed by the service 112. The machine learning capabilities relate to the development, training, and deployment of machine learning models, including but not necessarily limited to neural networks. A neural network, which may also be referred to as an artificial neural network, comprises a network of artificial, or simulated, neurons. The neurons may sometimes be referred to as nodes. A neural network may be represented by data that implicitly or explicitly defines its architecture (e.g., the interconnections between the neurons) and parameters that define the operation or characteristics of the neurons. Examples of such parameters include those that relate to weights applied to the input and output of a neuron, and those that relate to a neuron's activation function. These parameters may be determined by a training process facilitated by the machine learning service 112. Once trained, the machine learning service 112 may facilitate the use of the neural network, for example to make an inference using a trained neural network.

In at least one embodiment, the translation coordinator 108 processes a translation request by causing the machine learning service 112 to load one of the neural networks 114 that have been trained, using general-purpose examples, to perform language translation from the source language to the destination language. The loaded neural network may, at this stage, have adequate translation accuracy for most general-purpose translation tasks, but may not be well suited to the incoming translation request.

The translation coordinator 108 may then, in at least one embodiment, cause the parallel data to be loaded and indexed by the data storage and indexing service(s) 110. For example, the translation coordinator 108 may send instructions to the data storage and indexing service(s) 110 indicating that the parallel data to be loaded from storage and indexed. The indexing may be done in order to facilitate generation of applicability scores for the various examples contained in the parallel data. For example the indexing may allow for efficient access to the words, phrases, or n-grams of the source-language portion of a translation example. This information may be used, in at least one embodiment, in computation of a bilingual evaluation understudy ("BLEU") score which may be computed to estimate the applicability of an example to a portion of the source text.

In at least one embodiment, the translation coordinator ranks the translation examples according to their applicability to their applicability to portions of the source text. The translation coordinator 108 then causes the neural network to be additionally trained using top-ranked examples. The training may be facilitated by the machine learning service 112. As noted, the neural network, when loaded, has been trained for general-purpose translation but not for the particular domain of the source text. Here, domain refers to an area of specialty to which the source text relates. Example areas may include any of a field of study, a profession, a market segment, a business, an organization, and so on.

The additional training may include the use of meta-parameters to guide the training, where the meta-parameters are derived from the applicability of the top-ranked examples. In at least one embodiment, a learning rate and a number of epochs are determined based on the applicability of the examples. For example, the learning rate and number of epochs may increase in proportion to the applicability of the top-ranked examples to the portion of text to be translated. In at least one embodiment, certain portions of the neural network, such as the encoder portion, may be frozen while the additional training is performed. In at least one embodiment, a portion of the neural network is frozen by not adjusting its parameters during the additional training.

The additionally trained neural network may then be used to translate applicable portions of the source text. In at least one embodiment, these portions of the source text are those which were determined to be relevant to the top-ranked examples. Other portions of the source text may be translated using the default neural network, referring to a neural network that has been trained using general-purpose examples, but not yet trained with any domain-specific examples. The translated portions can then be reassembled by the translation coordinator 108, and the translation of the original source text provided to the requesting client application.

Figure 2:
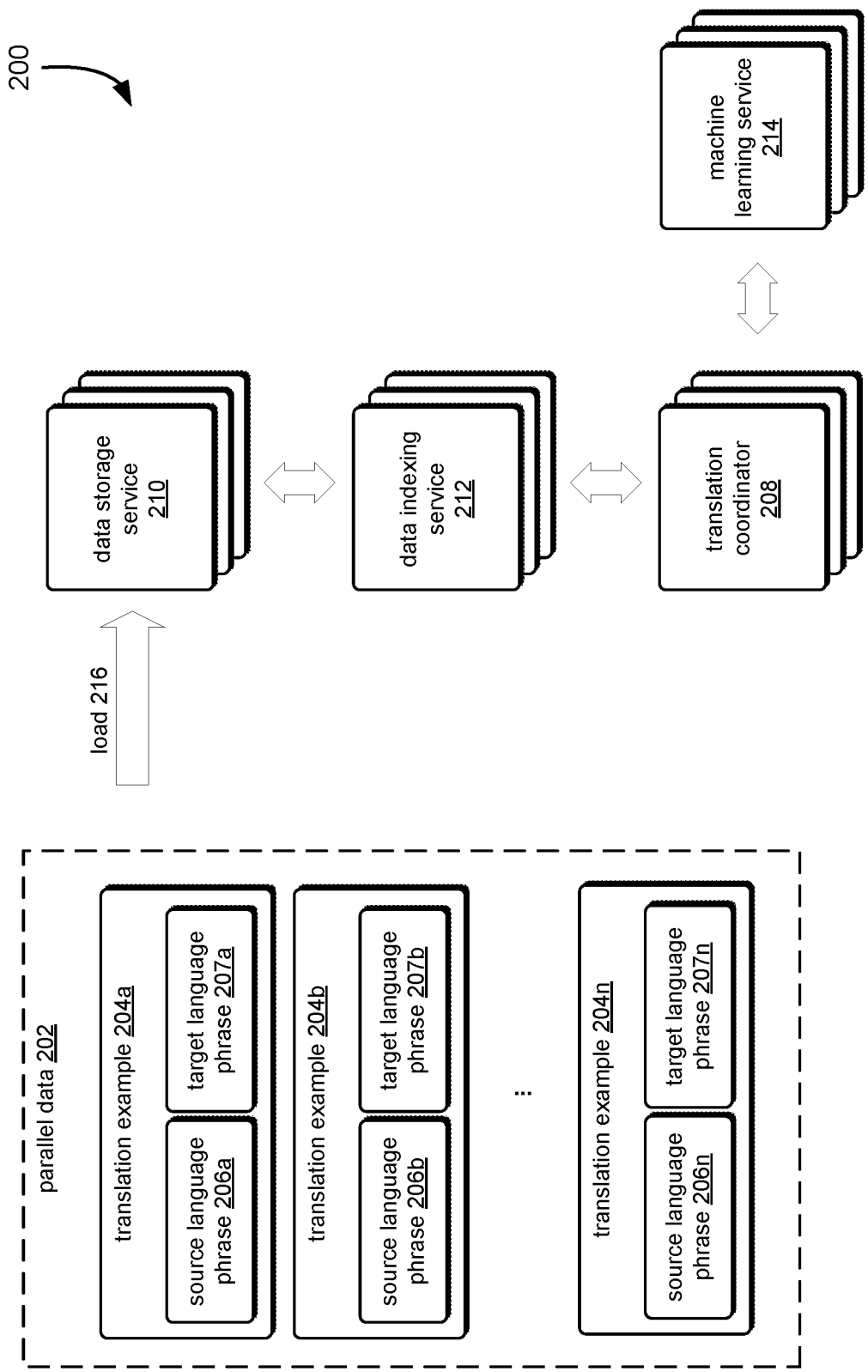
FIG. 2 illustrates an example of submission, storage, and processing of parallel data for machine-based translation, in accordance with an embodiment.

FIG. 2 illustrates an example of submission, storage, and processing of parallel data for machine-based translation, in accordance with an embodiment. In the example 200, an embodiment of parallel data 202 comprises a plurality of translation examples 204a-n, each of which comprises a corresponding source language phrase 206a-n and a target language phrase 207a-n. The parallel data 202, which may also be referred to as a parallel dataset, example data, extension data, and so forth, is provided by a user of a translation service, such as the translation service 102 that is depicted in FIG. 1. The parallel data 202, moreover, pertains to one or more particular domains to which the user's translation tasks are expected to pertain. In at least one embodiment, the user may provide multiple sets of parallel data, each pertaining to a particular domain. In other embodiments, a single set of parallel data, pertaining to multiple domains, is provided. In at least one embodiment, the translation system 102 is capable of determining whether or not particular examples in provided parallel data are applicable to a particular translation task. This capability, in at least one embodiment, is due to the applicability and ranking determinations described herein.

The parallel data 202, when provided by the user, may be provided in any of a variety of forms, including but not limited to flat text file, extended markup language ("XML") file, translation memory exchange ("TMX") file, binary file, and so forth. In at least one embodiment, the parallel data is provided by the user as one or more documents in a first language that have been annotated with desired translations to a second language. It will be appreciated that these examples are intended to be illustrative rather than limiting, and that as such, the examples should not be construed in a manner which would limit the scope of potential embodiments to only those that include the specific examples provided.

In at least one embodiment, when a user provides parallel data 202, it triggers a load process 216. The load process 216 may, in some cases, be initiated and managed by a control plane, such as the control plane 106 depicted in FIG. 1.

The parallel data 202 may be stored in a data storage service 210. The data storage service 210 may correspond to some of the data storage and indexing service(s) 110 depicted in FIG. 1. The data storage service 210, in at least one embodiment, is a scalable storage service permitting the parallel data to be stored as file or other similar structure. The parallel data 202 may be stored, for example, as a text file, XML, file, database file, and so forth. Note that although several examples described herein refer to the parallel data being loaded and indexed in response to a request to perform a translation task, there may be embodiments in which the data is pre-indexed, and the index is stored as a file by the data storage service 210. This approach may help to minimize subsequent processing by the data indexing service 212.

The data indexing service 212 loads parallel data 202 from the data storage service 210 and facilitates various operations on the data that will be performed in conjunction with the translation coordinator 208. The data indexing service 212 may correspond to some of the data storage and indexing service(s) 110 depicted in FIG. 1. Among the operations performed by the data indexing service 212 may be those related to determining the applicability of the translation examples 204a-n to portions of a source text that is to be translated. For example, as described herein, the translation coordinator 208 may compare n-grams in the translation examples 204a-n to matching n-grams in the source text, and based on such comparisons calculate a score, such as a BLEU score, which provides an indication of how applicable an example is to a portion of the source text. The data indexing service 212 can facilitate these operations, for example by allowing potentially applicable examples to be found efficiently using an index, based on words, phrases, or other parts of speech in the source text.

The translation coordinator 208 may correspond to the translation coordinator 108 depicted in FIG. 1. Like the data indexing service 212, the translation coordinator 214 may, in at least one embodiment, be activated in response to the receipt of a request to translate a source text. In addition to identifying applicable translation examples, as described above, the translation coordinator 208, in at least one embodiment, ranks the examples by applicability, causes machine learning service 214 to load a pre-trained neural network, and further causes the machine learning service 214 to perform additional training on the neural network using the top-ranked examples. The translation coordinator 208 may then complete the translation process by using the additionally trained neural network to translate portions of the source text and then generating the translated document.

The data storage service 210, data indexing service 212, translation coordinator 208, and machine-learning service may, in various embodiments, operate as independently scalable services. For example, any one of these services 208-214 may operate on virtual machines hosted by fleets of computing hardware, to which additional virtual machines or computing hardware may be added or removed depending on demand. Further, the computing resources by which services 208-214 operate may be independently allocated to perform aspects of a translation job as needed, and then released when no longer needed. Regarding the data storage service, the parallel data may be stored as inert files until needed. Likewise, the pre-trained neural networks may also remain stored as inert data files until needed.

Figure 3:
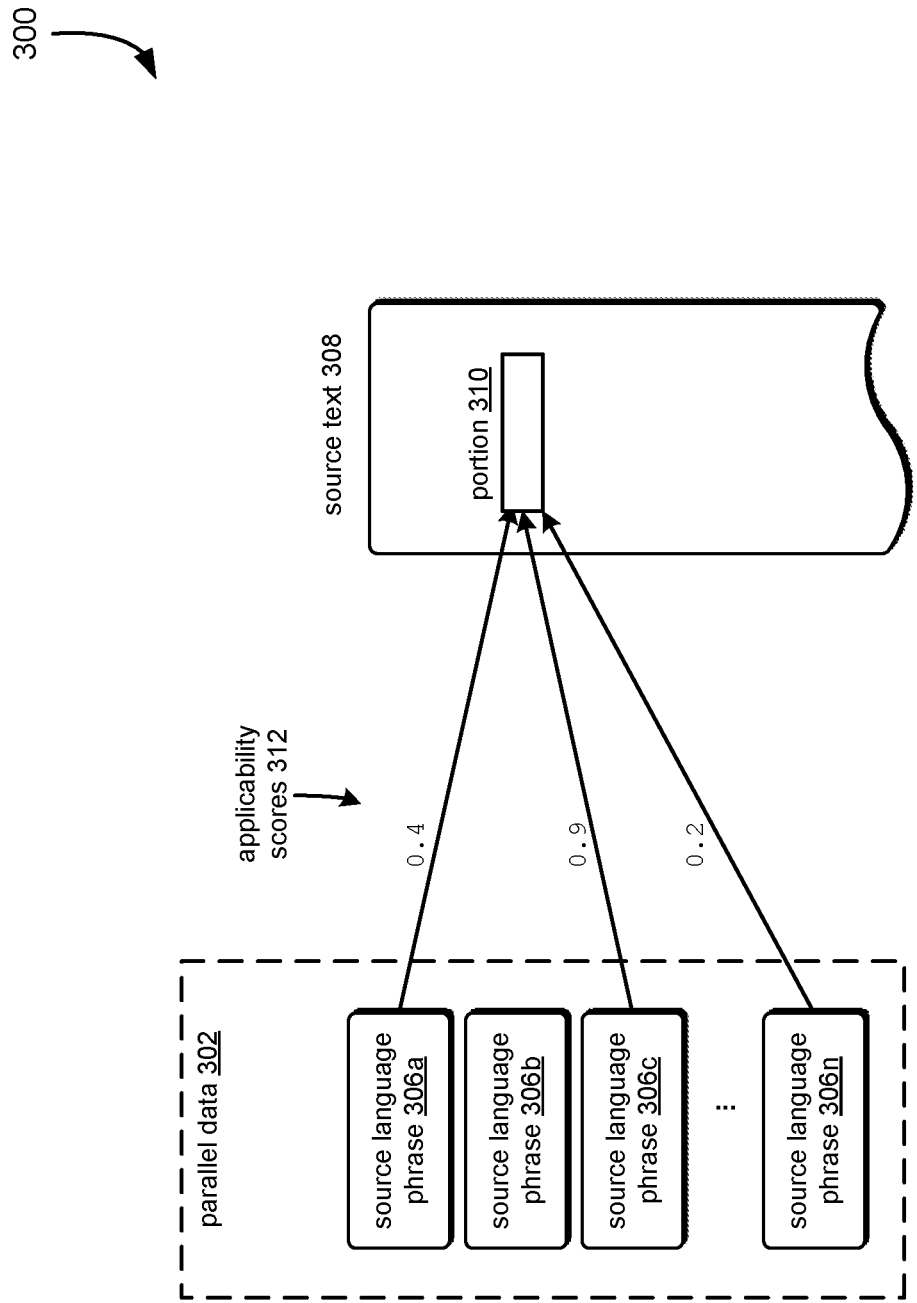
FIG. 3 illustrates an example of ranking applicability of source-language phrases in parallel data to a portion of a source text, in accordance with an embodiment.

FIG. 3 illustrates an example of ranking applicability of source-language phrases in parallel data to a portion of a source text, in accordance with an embodiment. The depicted example 300 shows identification and generation of applicability scores 312 for source phrases 306a-n. Note that although FIG. 3 depicts only the source language phrases 306a-n, the parallel data 302 may correspond to the parallel data depicted in FIGS. 1 and 2, and may therefore also comprise corresponding target language phrases.

In the example 300, the source language phrases 306a-n are compared to the contents of a portion 310 of the source text 308. The source language phrases 306a-n and the portion 310 of the source text 308 are in the same language. Based on the comparison, an applicability score 312 is calculated for at least some of the source language phrases 306a-n. In at least one embodiment, the source language phrases 306*a*-*n* are then ranked according to their respective applicability scores, and the top-ranked phrases used to additionally train a neural network to translate the portion 310.

The applicability scores 312 may be generated by comparing the source language phrases 306*a*-*n* to the contents of the portion 310 of the source text 308. For example, in at least one embodiment, n-grams in the parallel data's source language phrases 306*a*-*b* are compared to n-grams in the portion 310 of the source text 308, and a score is generated based on this comparison. For example, a score of 1.0 could indicate that the source language phrase and some or all of the portion 310 are identical, and a score of 0.0 could indicate that the source language phrase and some or all of the portion 310 are completely dissimilar. In at least one embodiment, an applicability score is calculated based on the number of times an n-gram in a source language phrase occurs in the portion 310. In at least one embodiment, the applicability score is generated based on the BLEU algorithm. A variety of techniques, in addition to or instead of BLEU, may be used to generate an applicability score. Examples may include, but are not necessarily limited to, bidirectional measures of similarity, neural network or other machine-learning techniques, embeddings, rank-based intuitive bilingual evaluation scores, and so forth.

In at least one embodiment, a translation system translates phrases in the source text that have exact, or near exact, correspondence with one of the source language phrases 306*a*-*n* in the parallel data 302. For example, if the applicability score of a phrase was calculated as 1.0, the translation system might simply replace the exact match in the portion 310 with the target language phrase that corresponds to the matching source language phrase, rather than using an additionally trained neural network. If the applicability score is less than 1.0 (or some other relatively high threshold), an additionally trained neural network might be used.

The portion 310 of the source text 308 may represent some or all of the source text 308. In at least one embodiment, the portion 310 is some subset of the source text 308 that corresponds to a natural-language element of the source text 308. Examples of this natural-language element may include a phrase, sentence, or paragraph.

Figure 4:
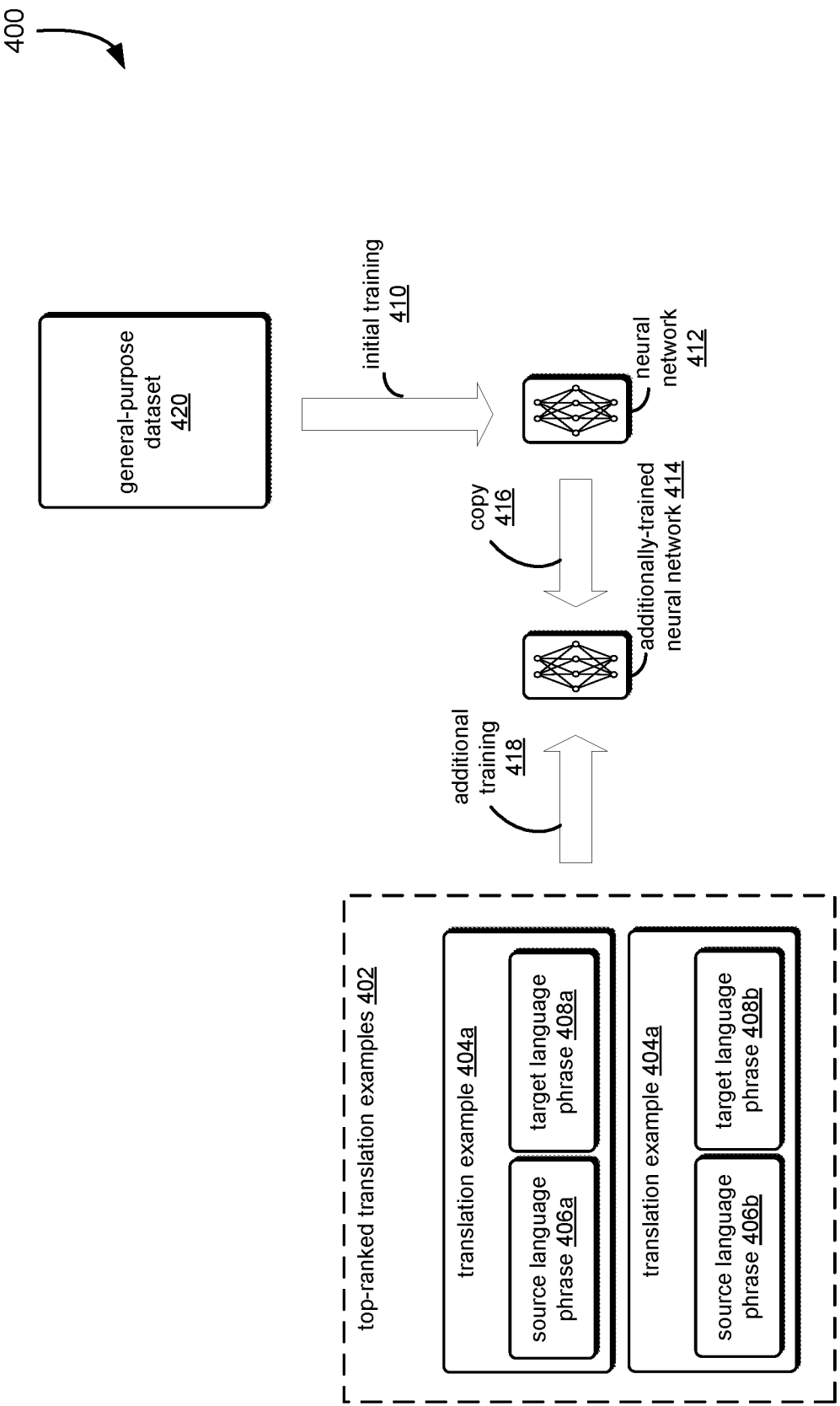
FIG. 4 illustrates an example of initial and additional training of a neural network for translating a source text to a destination language, in accordance with an embodiment.

FIG. 4 illustrates an example of initial and additional training of a neural network for translating a source text to a destination language, in accordance with an embodiment. In the example 400 of FIG. 4, the top-ranked translation examples 402 are identified based on the applicability scores 312 depicted in FIG. 3, and the source language phrases 406*a*-*b* correspond to certain of the source language phrases 306*a*-*n* depicted in FIG. 3. In particular, the source language phrases 406*a*-*b* correspond to the top-ranked source language phrases, such as source language phrase 306*a* and 306*c*, which in the example 300 were determined to have the highest applicability scores with respect to the portion 310 of the source text 308. The source language phrases 406*a*-*b* are elements of corresponding translations examples 404*a*-*b*, and also comprise corresponding target language phrases 408*a*-*b*.

A neural network 412, in at least one embodiment, is trained using a general-purpose dataset 420 to perform translation tasks. The general-purpose dataset 420 may, for example, consist of translation examples representative of typical translation tasks. Once trained on the general-purpose dataset 420, the neural network 412 may be capable of suitably translating most general purpose translation tasks, e.g., those conformant to the examples in the general-purpose dataset 420, but may not be fully capable of performing special-purpose translation tasks.

In at least one embodiment, data representative of the neural network 412 is stored by a storage service, such as the storage service 110 depicted in FIG. 1, and can be used via a machine learning service, such as the machine learning service 112 depicted in FIG. 1. The data representative of the neural network 412 can comprise various parameters and variables that may define the neural network 412, potentially including data defining the neural network's architecture, weights, activation thresholds, and so forth.

A copy 416 of the neural network 412 may be obtained, onto which an additional training process 418 may be performed to generate an additionally-trained neural network 414. The additional training process 418 is based on the top-ranked translation examples 402. For example, in at least one embodiment, application programming interfaces of a machine learning service are invoked to perform training iterations on the copy 416 of the neural network 412. The hyper-parameters of the additional training process 418 may also be controlled via application programming interfaces of the machine-learning service. Some of the hyper-parameters, in at least one embodiment, are derived from values obtained by analysis of the source text.

Figure 5:
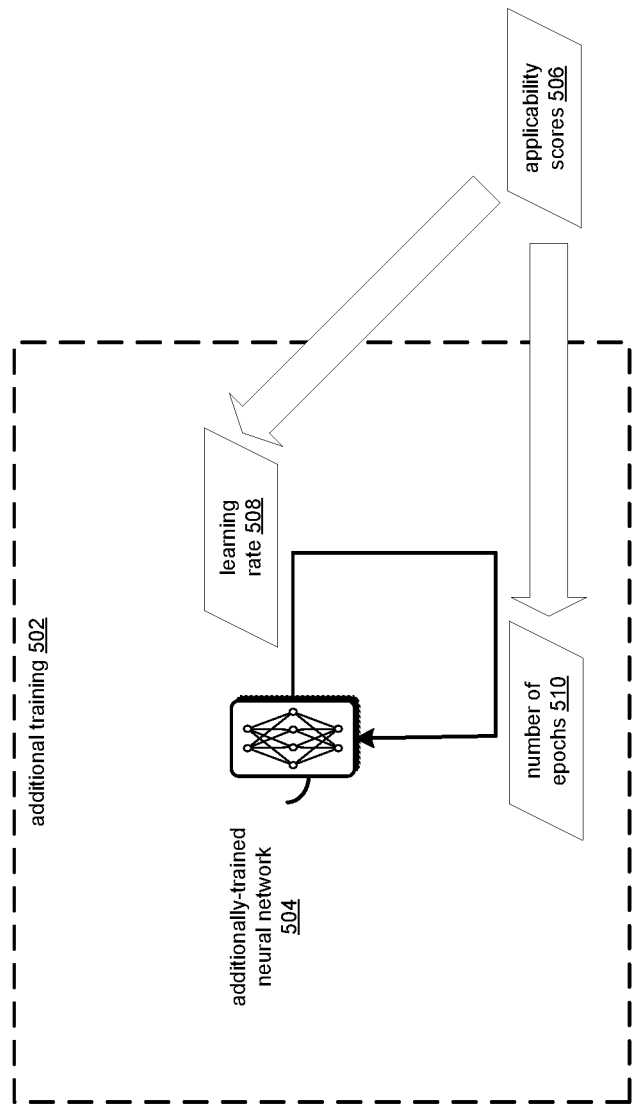
FIG. 5 illustrates an example of setting parameters for additional training of a neural network for translating a source text to a destination language, in accordance with an embodiment.

FIG. 5 illustrates an example of setting hyper-parameters for additional training of a neural network for translating a source text to a destination language, in accordance with an embodiment. Referring back to the example 400 of FIG. 4, hyper-parameters for the additional training process 418 may be based on values obtained by analysis of the source text. In the example 500 of FIG. 5, an additional training process 502, which may correspond to the additional training process 418 depicted in FIG. 4, is performed using hyper-parameters derived from one or more applicability scores 506.

In at least one embodiment, the applicability scores 506 are indicative of the degree to which one or more of the top-ranked examples are applicable to the source text. The applicability scores 506 may correspond to the applicability scores described in relation to the other figures, such as the applicability scores 312 depicted in FIG. 3. In at least one embodiment, the applicability scores 506 are calculated by comparing n-grams or other phrases or words in a translation examples to matching or similar n-grams or other phrases or words in the source text. In at least one embodiment, the applicability scores 506 are calculated using BLEU, or other similar algorithm.

In at least one embodiment, the additional training process 502 uses hyper-parameters that guide the training process. In at least one embodiment, these hyper-parameters include a learning rate 508 and a number of epochs 510. The learning rate, in at least one embodiment, controls the amount by which the neural network is changed in response to an estimated error. Larger rates may result in a model that more rapidly adapts to the provided examples, while a smaller rate may result in a model that adapts more slowly. The number of epochs defines how many times the training dataset (in this case, the top-ranked examples) is used to refine the neural network 504.

The learning rate and number of epochs may increase in proportion to the applicability scores 506. For example, when the top-ranked examples are highly applicable, the learning rate 508 may be set such that training adapts more rapidly. The number of epochs may also, in some embodiments, be set higher, so that the network is made to more thoroughly adapt to the additional examples. Likewise, if the top-ranked examples are less relevant, the learning rate may be set to a less aggressive value, and fewer epochs may be used.

It will be appreciated that the particular examples of hyper-parameters, and the specific examples of setting the hyper-parameters based on applicability scores 506, is intended to be illustrative, rather than limiting. Other embodiments may use additional or different hyper-parameters, for example, or perform different tuning measures based on the applicability scores 506.

Figure 6:
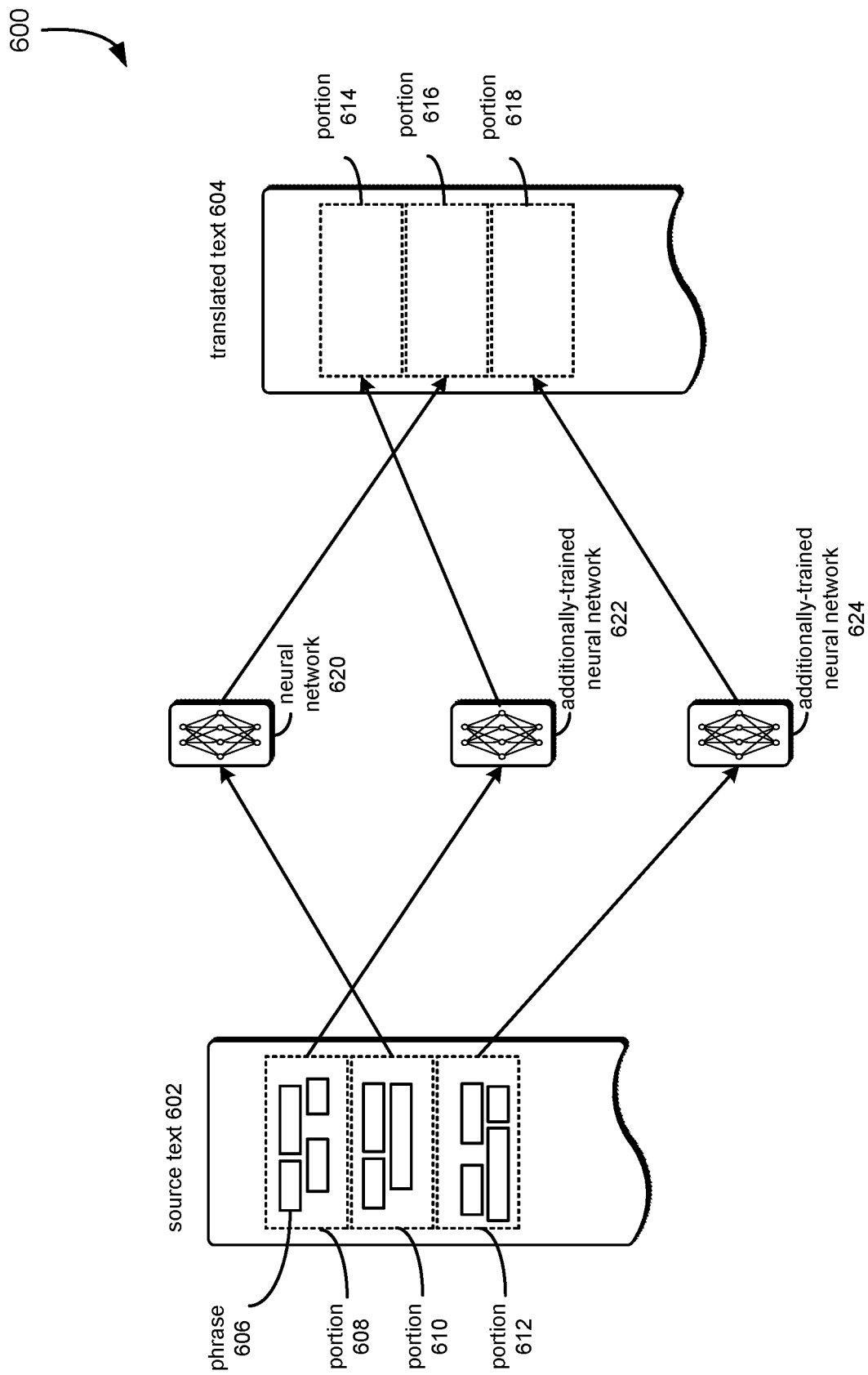
FIG. 6 illustrates an example of batch translation of portions of a source text, in accordance with an embodiment.

FIG. 6 illustrates an example of batch translation of portions of a source text, in accordance with an embodiment. In the example 600 of FIG. 6, a source text 602 is to be translated from a source language to a destination language. The source text 602 comprises multiple portions 608, 610, 612. The portions may each contain various phrases, such as the depicted phrase 606.

In the example 600, the separate portions 608, 610, 612 of the source text are translated separately using different neural networks 620, 622, 624, some of which are additionally trained with examples relevant to the respective portions. For example, a translation system, such as the translation system 102 depicted in FIG. 1, analyzes source text 602 to identify portions of the text for which there are applicable examples in the parallel data. In at least one embodiment, each portion comprises one or more sentences, paragraphs, or other textual units. The translation system 102 generates applicability scores, such as BLEU scores, for examples in the parallel data, and ranks the examples according to applicability score. For a given portion, if the top-ranked examples have applicability scores greater than some threshold, that portion can be translated using a neural network additionally trained using those examples.

To illustrate, in the example 600, a first set of examples may have been to be relevant to a first portion 608 of the source text 602. For example, applicability scores for the first set of examples, with respect to the first portion 608, may have been above a threshold amount. The translation system may use these examples to generate additionally-trained neural network 622, and to then translate the first portion 608 using the additionally-trained neural network 622. Similarly, the system may determine that a second set of examples is relevant to a third portion 612 of the source text 602, and use those examples to generate additionally-trained neural network 624, and then use additionally-trained neural network 624 to translate the third portion 612. On the other hand, a second portion 612 may have no relevant examples, or only have examples whose applicability score is below a threshold amount. This portion 612 can be translated, by the translation system, using a pre-trained neural network 620.

After translation, the translated portions 614, 616, 618 (corresponding to the source-language portions 608, 610, 612) are reassembled, by the translation system, into a translated text 604.

In at least one embodiment, the translation of the various source-text portions 608, 610, 612 are performed in parallel, using additionally-neural networks where applicable.

In at least one embodiment, additionally-trained neural networks are reused for separate portions when the top-ranked translation examples are similar or identical between the two portions.

Figure 7:
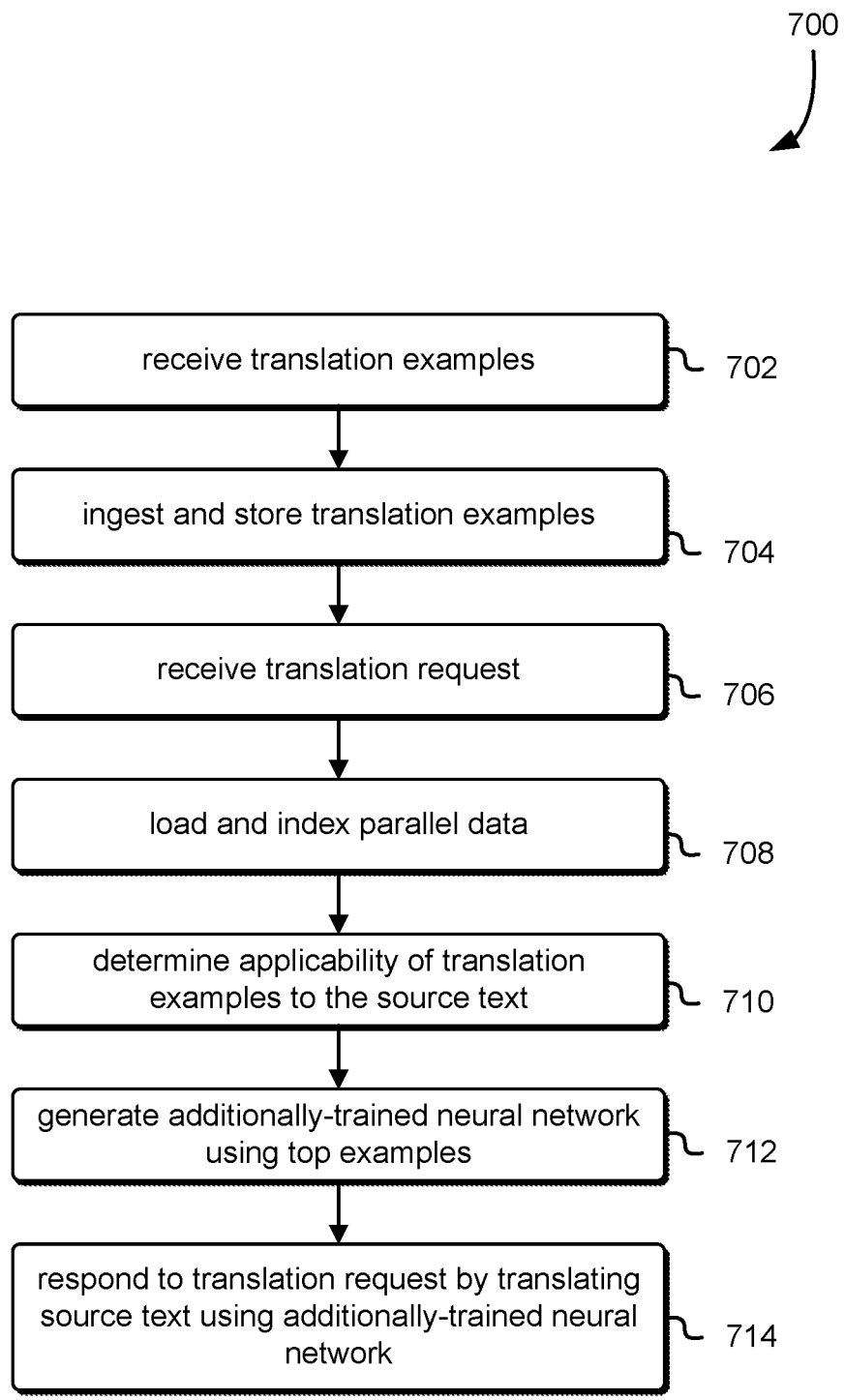
FIG. 7 illustrates an example process of providing a service-based implementation of a customizable translation service, in accordance with an embodiment.

FIG. 7 illustrates an example process of providing a service-based implementation of a customizable translation service. Although the example 700 of FIG. 7 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In at least one embodiment, the steps depicted in relation to FIG. 7 are performed by a distributed translation system, such as an embodiment of the translation system 100 depicted in FIG. 1 that is implemented as a distributed service.

At 702, the distributed translation system receives translation examples. The translation examples may sometimes be referred to as parallel data, translation data, and so forth. The received translation examples may correspond, for example, to any of the embodiments of parallel data or translation examples described in relation to the other figures.

At 704, the distributed translation system ingests and stores the parallel data. In at least one embodiment, a service-based storage architecture is used to store the parallel data. This may provide advantages in some embodiments, such as allowing for translation to be performed in serverless computing architectures where little or no storage has been explicitly allocated to a client who might use the translation services. In some embodiments, a low-cost storage service-based mechanism may be used, such that a wide variety of examples can be stored on behalf of a particular customer with little operational impact, since the examples can remain in inert storage until called upon for use in performing a translation task.

At 706, the distributed translation system receives a translation request. The request may correspond to any of the embodiments of a translation request described herein, such as those examples provided in relation to the other figures. Embodiments may provide any of a variety of application programming interfaces, communications protocols, or other tools or interfaces that may be used to request a translation or otherwise interact with the translation system. In at least one embodiment, application programming interfaces or communications protocols are used to interact with a translation service. In at least one embodiment, the translation service is compatible with serverless computing architectures.

At 708, the distributed translation system loads and indexes the parallel data. Examples of this are described herein in relation to the various figures, including FIGS. 1 and 2. In at least one embodiment, the translation examples are retrieved from a storage service and then loaded into a database or indexing service for further processing. In at least one embodiment, the database or indexing service is configured to facilitate determination of applicability scores with respect to the source text indicated by the translation request. For example, in at least one embodiment, indexing is performed to improve efficiency for searches of words, phrases, or other language units in the parallel data.

In at least one embodiment, the applicability determination may be storage and/or compute intensive. To address this, embodiments of the distributed translation system may allocate compute and storage capacity on-demand, e.g., in response to receiving the translation request.

At 710, the distributed translation system determines the applicability of translation examples in the parallel data to the source text. In at least one embodiment, this is done using the resources allocated in the previous example. The determination may be performed using any of a variety of techniques described herein, including but not limited to those based on calculation of an applicability score, such as those described in relation to the various figures.

At 712, the distributed translation system generates an additionally trained neural network using the top examples. In at least one embodiment, architecture and/or parameters of a pre-trained neural network are loaded from storage and used to initialize an operational neural network hosted by a machine learning service. As described herein with respect to the various figures, the pre-trained neural network is trained using examples from a dataset of commonplace examples. The distributed translation system generates the additionally trained neural network by providing the top examples to the machine learning service, and directing the machine learning service to apply the examples in one or more training cycles. Hyper-parameters of the training process may be provided by other components of the distributed translation system to the machine learning service. As described herein, the hyper-parameters may be based on the degree to which the examples are applicable to the document, or portion thereof, that is to be translated using the additionally trained neural network.

At 714, the distributed translation system responds to the translation request by translating the source text, using the additionally-trained neural network. Portions of this task, such as those involving inferences made by the additionally trained neural network, may be performed using the machine learning service. Other components of the distributed translation service, such as a translation coordinator consistent with the one depicted in FIGS. 1 and 2, may perform other tasks, such as assembling the translated portions into a final, translated document.

Figure 8:
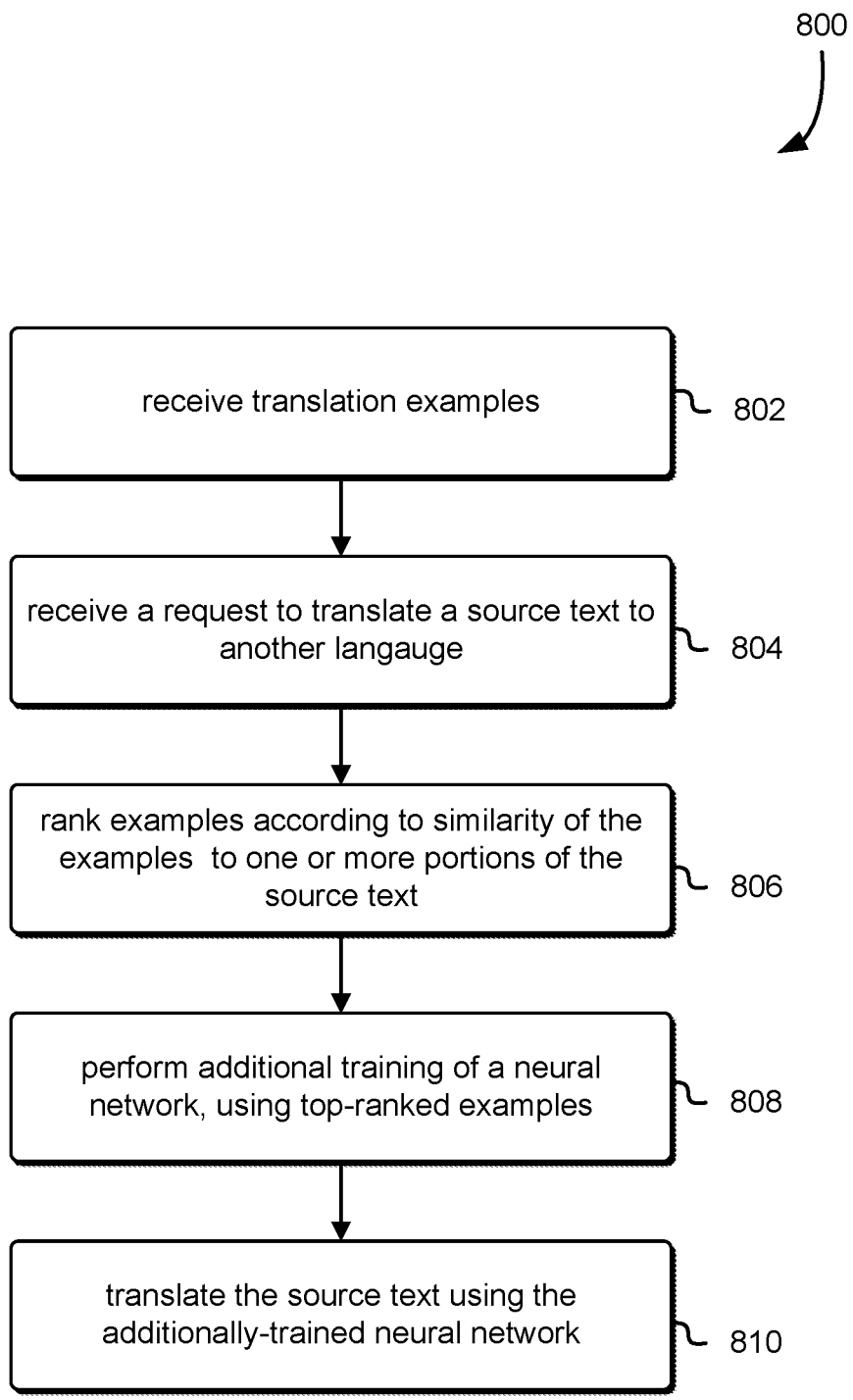
FIG. 8 illustrates an example process of customized translation of a source text, in accordance with an embodiment.

FIG. 8 illustrates an example process of customized translation of a source text, in accordance with an embodiment. Although the example 800 of FIG. 8 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In at least one embodiment, the steps depicted in relation to FIG. 8 are performed by one or more components of a translation system, such as an embodiment of the translation system 100 depicted in FIG. 1.

At 802, the translation system receives translation examples. The translation examples may sometimes be referred to as parallel data, translation data, and so forth. The received translation examples may correspond, for example, to any of the embodiments of parallel data or translation examples described in relation to the other figures.

At 804, the translation system receives a request to translate a source text to another language. The request may correspond to any of the embodiments of a translation request described herein, such as those examples provided in relation to the other figures. In one example, the request comprises a source text. In another example, the request comprises a source text, an indicator of the source language, and an indicator of the destination language. The request may further comprise, in this example, a reference to the translation examples that are to be used when performing the requested translation. In other cases, one or more of these aspects are inferred from context, or set via a separate request. Embodiments may provide any of a variety of application programming interfaces, communications protocols, or other tools or interfaces that may be used to request a translation or otherwise interact with the translation system.

At 806, the translation system ranks examples according to similarity of the examples to one or more portions of the source text. The ranking may be performed using any of a variety of techniques described herein, including but not limited to those based on ranking according to an applicability score, such as those described in relation to the other figures.

At 808, the translation system performs additional training of a neural network, using the top-ranked examples. The additional training operations may be performed in accordance with any of the embodiments of additional training of a neural network described herein, such as those described in relation to the other figures.

At 810, the translation system translates the source text, using the additionally-trained neural network. The translation operations may be performed in accordance with any of the embodiments described herein, such as those described in relation to the other figures.

In an example embodiment, a system for performing translation comprises at least one processor and at least one memory. The memory comprises instructions that, in response to execution by the at least one processor, cause the system to perform operations to translate a source text to a destination language.

In this example, execution of the instructions causes the system to receive one or more examples of translation. The one or more examples comprise at least a first phrase in a first language, and a second phrase in a second language, such that the second phrase is a translation of the first phrase.

In this example, execution of the instructions further causes the system to receive a request to translate a source text from a first language to a second language.

In this example, execution of the instructions further causes the system to rank the one or more examples based, at least in part, on a measure of similarity between the first phrase and one or more portions of the source text.

In this example, execution of the instructions further causes the system to perform additional training of a neural network. The neural network is initially trained to translate from the first language to the second language, using general-purpose examples of translation. The additional training is based on one or more of the top-ranking examples of translation. The top-ranking examples may be those whose applicability is ranked highest, and at least above a threshold level of applicability. The system may then translate the source text to the second language, using the additionally trained neural network.

In an aspect of this example, the system responds to receiving the request to translate the source text, by causing allocation of computing capacity, by one or more computing services, for use in ranking the one or more examples and performing the additional training.

In a further aspect of this example, the measure of similarity is calculated based at least in part on identification of n-grams in the first phrase that correspond to n-grams in the source text.

In a further aspect, the measure of similarity is calculated based at least in part on identification of a sequence of at least one of characters or words in the first phrase that have a corresponding sequence the source text.

In a further aspect of this example, execution of the instructions further cause the system to calculate a learning rate based, at least in part, on the measure of similarity; calculate a number of epochs based, at least in part, on the measure of similarity; and perform the additional training based, at least in part, on the learning rate and the number of epochs.

In a further aspect of this example, execution of the instructions further cause the system to translate a first portion of the source text using the additionally trained neural network; and translate a second portion of the source text using a version of the neural network that has not been additionally trained.

The various aspects just described are combinable in any way to form further embodiments consistent with the example just provided.

In another example, a method of translating a source text comprises steps which include receiving one or more examples of translations between a first language and a second language; receiving request to translate a source text from the first language to the second language; ranking the one or more examples based, at least in part, on applicability of the one or more of the one or more examples to one or more portions of the source text; performing additional training of a neural network trained to translate from the first language to the second language, the additional training based at least in part on one or more top-ranking examples; and translating, based at least in part on the additionally trained neural network, the source text from the first language to the second language.

In a further aspect, the method also comprises communicating, in response to receiving the request to translate the source text, with one or more services to request allocation of computing capacity for ranking the one or more examples.

In a further aspect, the one or more examples are loaded from a storage service in response to receiving the request to translate the source text.

In a further aspect, an example, of the plurality of examples, comprises a phrase in the first language and a corresponding translation of the phrase in the second language.

In a further aspect, a sequence of words or characters in an example in the first language is compared to a corresponding sequence of words or characters in the second language.

In a further aspect the method also comprises generating a score indicative of similarity between the phrase in the first language and a portion of the source text, wherein the ranking of the plurality of examples is based, at least in part, on the score.

In a further aspect, the method also comprises determining, based at least in part on a score indicative of the applicability of the one or more of the plurality of examples to the one or more portions of the source text, a learning rate and a number of epochs for the additional training, wherein the additional training is performed based at least in part on the learning rate and the number of epochs.

In a further aspect, the method also comprises translating a first portion of the source text using the additionally trained neural network; and translating a second portion of the source text using a second neural network. In a further aspect, applicability of the one or more of the plurality of examples to the first portion is above a threshold amount. In a further aspect, the second neural network is not additionally trained using the plurality of examples.

The various aspects just described are combinable in any way to form further embodiments consistent with the example just provided.

In another example, a non-transitory computer-readable storage medium comprises instructions that, in response to execution by at least one processor of a computing device, cause the computing device to at least receive a request to translate a source text from a first language to a second language; load, from storage, a plurality of examples of translations between a first language and a second language; rank the plurality of examples based, at least in part, on applicability of the one or more of the plurality of examples to one or more portions of the source text; perform additional training of a neural network trained to translate from the first language to the second language, the additional training based at least in part on one or more top-ranking examples of the plurality of examples; and translate, based at least in part on the additionally trained neural network, the source text from the first language to the second language.

In an aspect of this example, the applicability is determined based at least in part on n-grams in the plurality of examples of translation that correspond to n-grams in the source text.

In a further aspect of this example, the non-transitory computer-readable medium comprises further instructions that, in response to execution by the at least one processor, cause the computing device to at least calculate a learning rate based, at least in part, on a measure of the applicability of the one or more of the plurality of examples to one or more portions of the source text; calculate a number of epochs based, at least in part, on the measure of applicability; and perform the additional training based, at least in part, on the learning rate and the number of epochs.

In a further aspect of this example, an encoder portion of the neural network is frozen during the additional training. For example, the parameters of the frozen portion are, in at least one embodiment, kept fixed during the additional training, e.g., by not being recalculated based on an error signal generated based on the examples of translation.

In a further aspect of this example, a plurality of portions of the source text are translated, in parallel, using a plurality of additionally trained neural networks.

In a further aspect of this example, the non-transitory computer-readable medium comprises further instructions that, in response to execution by the at least one processor, cause the computing device to at least translate a first portion of the source text using the additionally trained neural network; and translate a second portion of the source text using a version of the neural network that has not been additionally trained.

The various aspects just described are combinable in any way to form further embodiments consistent with the example just provided.

Figure 9:
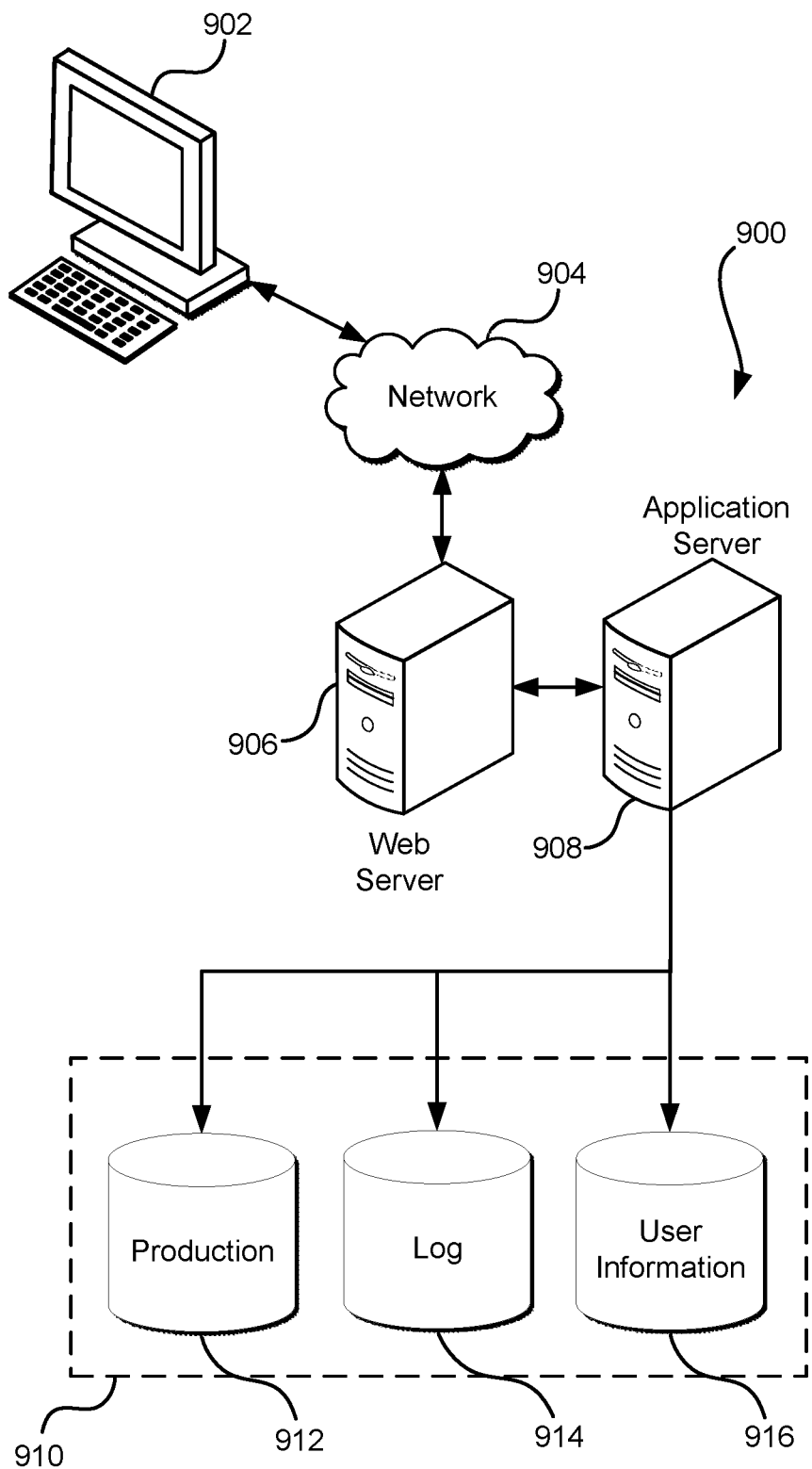
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory, the at least one memory comprising instructions that, in response to execution by the at least one processor, cause the system to at least:
   receive two or more examples of translation, wherein an example of translation comprises a first phrase in a first language and a second phrase in a second language, the second phrase a translation of the first phrase;
   receive a request to translate a source text from the first language to the second language;
   rank the two or more examples with respect to a plurality of examples based, at least in part, on a measure of similarity between the first phrase and one or more portions of the source text;
   perform additional training of a neural network trained to translate from the first language to the second language, the additional training based at least in part on one or more top-ranking examples of the two or more examples, and at least a portion of an encoder of the neural network is unchanged during the additional training of the neural network; and
   translate, based at least in part on the additionally trained neural network, the source text from the first language to the second language.

2. The system of claim 1, wherein the system, in response to receiving the request to translate the source text, causes allocation of computing capacity, by one or more computing services, for ranking the two or more examples and performing the additional training.

3. The system of claim 1, wherein the measure of similarity is calculated based at least in part on identification of a sequence of at least one of characters or words in the first phrase that have a corresponding sequence the source text.

4. The system of claim 1, the at least one memory comprising further instructions that, in response to execution by the at least one processor, cause the system to at least:
   calculate a learning rate based, at least in part, on the measure of similarity;
   calculate a number of epochs based, at least in part, on the measure of similarity; and
   perform the additional training based at least in part, on the learning rate and the number of epochs.

5. The system of claim 1, the at least one memory comprising further instructions that, in response to execution by the at least one processor, cause the system to at least:
   translate a first portion of the source text using the additionally trained neural network; and
   translate a second portion of the source text using a version of the neural network that has not been additionally trained.

6. A method, comprising:
   receiving one or more examples of translations between a first language and a second language;
   receiving a request to translate a source text from the first language to the second language;
   ranking the one or more examples based, at least in part, on applicability of at least the first language of the one or more examples to one or more portions of the source text;
   performing additional training of a neural network trained to translate from the first language to the second language, the additional training based at least in part on selecting one or more top-ranking examples of the one or more ranked examples, and at least a portion of an encoder of the neural network is unchanged during the additional training of the neural network; and
   translating, based at least in part on the additionally trained neural network, the source text from the first language to the second language.

7. The method of claim 6, further comprising:
   communicating, in response to receiving the request to translate the source text, with one or more services to request allocation of computing capacity for ranking the one or more examples.

8. The method of claim 6, wherein the one or more examples are loaded from a storage service in response to receiving the request to translate the source text.

9. The method of claim 6, wherein an example, of the one or more examples, comprises a phrase in the first language and a corresponding translation of the phrase in the second language.

10. The method of claim 6, further comprising:
    generating a score indicative of similarity between a first language portion of one of the one or more examples and a portion of the source text, wherein the ranking of the one or more examples is based, at least in part, on the score.

11. The method of claim 6, further comprising:
    determining, based at least in part on a score indicative of the applicability of the one or more of the one or more examples to the one or more portions of the source text, a learning rate and a number of epochs for the additional training, wherein the additional training is performed based at least in part on the learning rate and the number of epochs.

12. The method of claim 6, further comprising:
    translating a first portion of the source text using the additionally trained neural network; and
    translating a second portion of the source text using a second neural network.

13. The method of claim 6, wherein a first portion of the source text is translated using the additionally trained neural network based, at least in part, on an applicability score of the one or more of the one or more examples being above a threshold amount.

14. The method of claim 6, wherein a second portion of the source text is translated using a neural network that has not been additionally trained using the one or more examples.

15. A non-transitory computer-readable storage medium comprising instructions that, in response to execution by at least one processor of a computing device, cause the computing device to at least:
- receive a request to translate a source text from a first language to a second language;
- load, from storage, one or more examples of translations between the first language and the second language;
- rank the two or more examples based, at least in part, on applicability of at least the first language of the one or more of the two or more examples to one or more portions of the source text;
- perform additional training of a neural network trained to translate from the first language to the second language, the additional training based at least in part on one or more top-ranking examples of the two or more examples, and at least a portion of an encoder of the neural network is unchanged during the additional training of the neural network; and
- translate, based at least in part on the additionally trained neural network, the source text from the first language to the second language.

16. The non-transitory computer-readable medium of claim 15, wherein the applicability is determined based at least in part on n-grams in the two or more examples of translation that correspond to n-grams in the source text.

17. The non-transitory computer-readable medium of claim 15, comprising further instructions that, in response to execution by the at least one processor, cause the computing device to at least:
- calculate a learning rate based, at least in part, on a measure of the applicability of the one or more of the two or more examples to one or more portions of the source text;
- calculate a number of epochs based, at least in part, on the measure of applicability; and perform the additional training based, at least in part, on the learning rate and the number of epochs.

18. The non-transitory computer-readable medium of claim 15, wherein a portion of the neural network is frozen during the additional training.

19. The non-transitory computer-readable medium of claim 15, wherein a plurality of portions of the source text are translated, in parallel, using a plurality of additionally trained neural networks.

20. The non-transitory computer-readable medium of claim 15, comprising further instructions that, in response to execution by the at least one processor, cause the computing device to at least:
- translate a first portion of the source text using the additionally trained neural network; and
- translate a second portion of the source text using a version of the neural network that has not been additionally trained.

* * * * *